March 5, 1957

G. L. BORELL 2,784,394

COMPENSATED RELAY AND CONTROL SYSTEM

Filed April 3, 1953

2 Sheets-Sheet 1

INVENTOR
George L. Borell
BY
Pennie, Edmunds, Morton, Barrows & Taylor
ATTORNEYS March 5, 1957 G. L. BORELL 2,784,394
COMPENSATED RELAY AND CONTROL SYSTEM
Filed April 3, 1953 2 Sheets-Sheet 2

INVENTOR
*George L. Borell*
BY
*Pennie, Edmonds, Morton, Barrows & Taylor*
ATTORNEYS

United States Patent Office 2,784,394
Patented Mar. 5, 1957

2,784,394

COMPENSATED RELAY AND CONTROL SYSTEM

George L. Borell, Ridgewood, N. J., assignor to Economics Laboratory, Inc., St. Paul, Minn., a corporation of Delaware Application April 3, 1953, Serial No. 346,745

27 Claims. (Cl. 340—213)

This invention relates to self-compensating electromagnetic relays and control systems which utilize the same. Although the relay and control system in accordance with the invention are adapted to many different specific applications, they are especially useful in controlling the concentration of solutions and the like and, accordingly, the invention is below described in that connection.

The relay of the present invention when employed in the manner described provides a simple and rugged control system which is cheap to manufacture, reliable in operation, and which requires substantially no servicing or upkeep expense. Also it can be designed to be very sensitive, and to provide accurate control of a required device or characteristic within close limits.

The system of the invention includes a self-compensating relay, viz., one in which the inherent operating differential is adjustably compensated, or under-compensated or over-compensated, so as to provide a wide range of control characteristics. Inherent relay operating differential is the difference in values of current required to actuate and to de-actuate the relay. A self-compensated relay is capable of oscillating, viz., periodically actuating and de-actuating automatically as long as the circuit conditions remain favorable. This compensation is here achieved by a thermostatic element which automatically resets the relay armature when the signal current which actuates the relay has assumed a predetermined value. By forming certain moving parts of the relay from resilient material the reset operation is of the snap-action type which enhances the reliability and precision of control.

Figure 1:
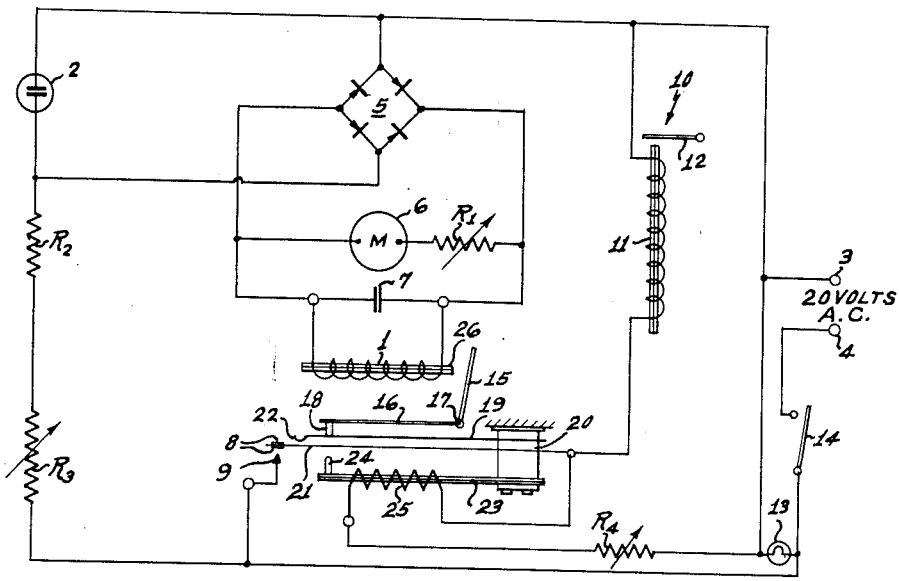
Figure 2:
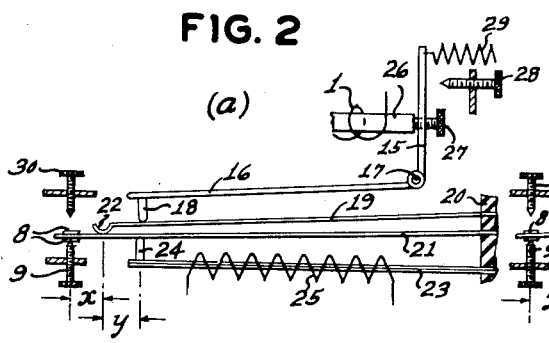
Figure 4:
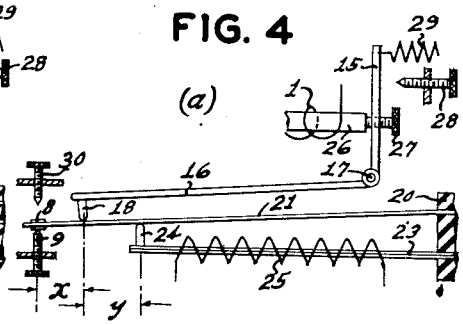
Figure 3:
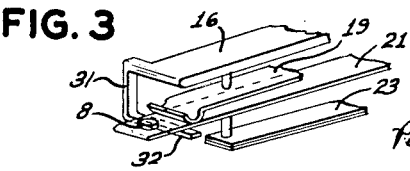
Figure 5:
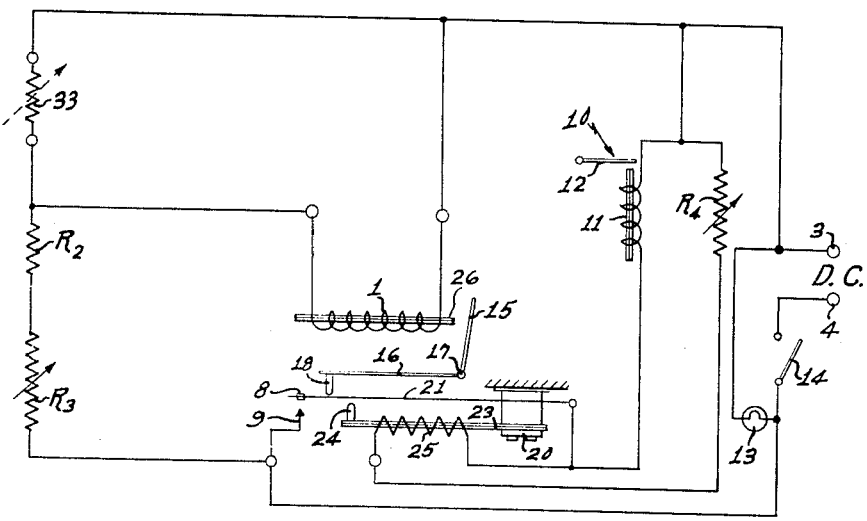
Figure 6:
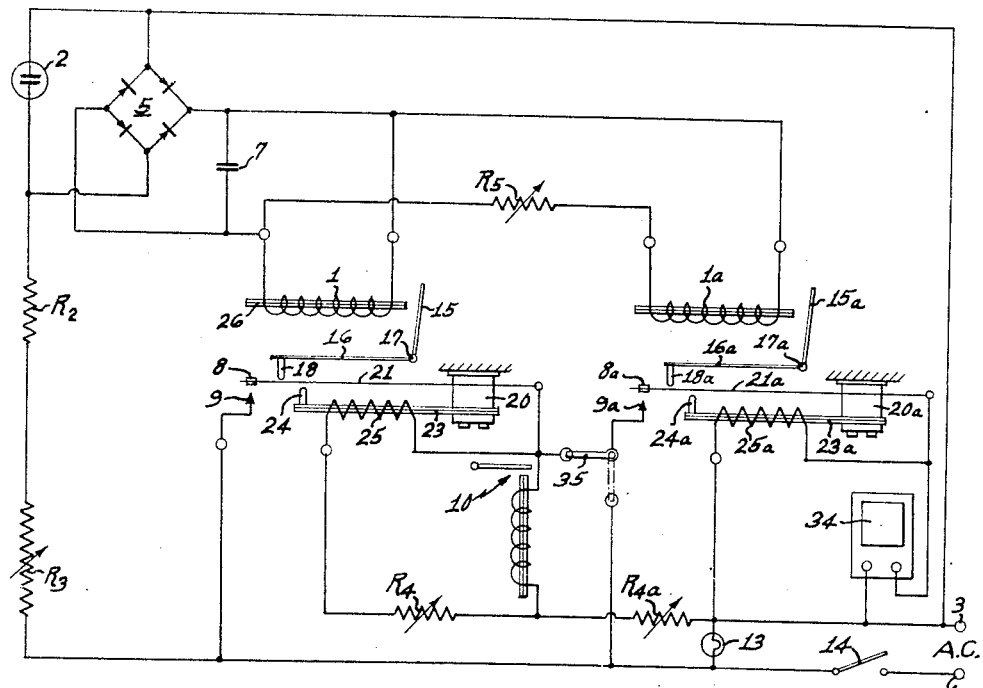

The nature of the invention will be better understood from the following description considered in connection with the accompanying drawings, in which:

Fig. 1 is a circuit diagram of a control system in accordance with the present invention;

Fig. 2(a) and Fig. 2(b) show in more detail the construction and mode of operation of a relay of the type represented in Fig. 1;

Fig. 3 is a fragmentary perspective view of a modification of the relay structure of Fig. 2 which is better adapted to the use of a back contact;

Fig. 2(a) and Fig. 4(b) show in similar detail a simplified form of the relay represented in Fig. 2;

Fig. 5 is a circuit diagram of a control system corresponding to that of Fig. 1, but in which the relay is of the type illustrated in Figs. 4(a), 4(b) and the system is specifically adapted to operation from a direct-current source; and Fig. 6 illustrates a control system based on that of Fig. 1 but which employs two relays of the type represented in more detail in Figs. 4(a), 4(b) and Fig. 5.

Referring now to the system of Fig. 1, the relay of the invention includes an electromagnetic actuating coil 1 on which the actuating current or control signal is impressed. (The construction of the relay is described in connection with Figs. 2–4.) In this example the control signal is derived from a sensing element 2 which essentially is a device of which the apparent impedance varies in accordance with the variable condition to be controlled. Such an element suitable for use in the control of the concentration of a detergent solution comprises the conductivity cell described in U. S. Patent No. 2,560,209, granted July 10, 1951. A cell of this type operates more reliably on alternating current, and such current is provided from the alternating-current source 3, 4. However, since a relay in accordance with the present invention is advantageously operated on uni-directional current, a full-wave rectifier 5 is provided. The input of this rectifier is connected, as shown, to receive the signal output from cell 2 and the output of the rectifier, in turn, is connected to the terminals of electromagnet 1. Milliammeter 6 connected in series with adjustable limiting resistor $R_1$ is useful in calibrating and monitoring the control system. It may also be used in the circuits of the other figures. Condenser 7 is of the filter type and smooths the uni-directional pulsations of signal current which are impressed upon coil 1. Moving contact 8 and fixed contact 9 which are closed by actuation of the relay serve to actuate the circuit or device to be controlled which in this example comprises an electromagnetic valve 10. This valve is here generally represented because it can comprise a large variety of devices. In the assumed example, valve 10 controls the flow of detergent solution into a washing tank, and basically it comprises an electromagnet (or solenoid) 11 and a valve member 12. The electromagnet 11 is connected at one side to terminal 3 of the power source and at the other side to moving contact 8 of the relay. Fixed contact 9 of the relay is connected through indicating lamp 13 and control switch 14 to the other terminal 4 of the power source.

Fixed resistor $R_2$ and variable resistor $R_3$ are connected in series between the sensing element and the electric power source and are employed to predetermine the magnitude of the signal voltage representing any desired condition of the characteristic being detected. In the present case control point resistor $R_3$ would constitute a concentration control, because by adjustment of the resistance thereof the solution concentration which is automatically maintained can be preselected.

One of the advantages of the present invention is that the entire system may operate on a low voltage supply, such as one of 20 volts or less. The output of an inexpensive bell-ringing transformer is suitable as a power source, the primary being connected to the customary 120 volt, 60 cycle power line, and the secondary to terminals 3, 4. The use of such low voltage simplifies the cost of manufacture and installation because it decreases the insulation and other problems incidental to the use of higher voltages and also permits simple and economical installations free of the Underwriters code requirements in respect to the usual 120-volt systems. Also, the use of low voltage removes the shock danger to personnel which is present when high voltages are employed in the vicinity of steam, water or aqueous solutions. All of the embodiments of the invention herein described include this same advantage.

The relay of the invention as represented in Fig. 1 includes besides the electromagnet 1, an armature 15 to which is attached an extension comprising an actuator arm 16, the two being pivoted at 17. Attached to the outer end of arm 16 is a pressure pin 18 which is normally in engagement with resilient blade 19. This blade is formed of spring metal and may be adjusted or formed so that it presses upwardly against pin 18, thus holding armature 15 in the de-actuated position as shown. The spring pressure of thise blade may be adjusted by deforming it. The right-hand end of blade 19, as viewed in the drawing, is fixed in insulating post 20. Immediately beneath blade 19 is a resilient contact-carrying strip 21. This may also be formed of spring metal and like blade 19 is fixed at one end in the post 20. Strip 21 at its free end carries a moving electrical contact 8 extending through the blade to the top and bottom. The lower moving contact 8 on strip 21 is moved downwardly to make contact with fixed electrical contact 9 by pressure on the strip exerted by bent portion or protrusion 22 at the end of blade 19 which, when the relay is actuated, is pressed against contact strip 21 at a point intermediate the contact 8 and pin 18. Thus pin 18 and blade 19 together comprise pressure means which actuate contact strip 21 when the relay is actuated.

Below contact-carrying strip 21 is mounted a thermostatic element 23 which is fixed at one end in insulating post 20 and is free to move at the opposite end. It is arranged to bend upwardly increasingly when heated. Near the free end a pressure pin 24 is secured so as to press contact strip 21 upwardly away from fixed contact 9 when thermostatic element 23 bends as the result of heating. Element 23 is heated by an electrical heater 25 which is wound around it and electrically insulated therefrom. As is clear from the diagram, this heater is energized from a power source 3, 4 by connection thereto when contacts 8, 9 are closed. The resistor $R_4$ is connected in a series circuit comprising the heater, contact strip 21, fixed contact 9, and means for connecting the electric power source 3, 4, assuming that control switch 14 is closed. Resistor $R_4$ thus provides an adjustment of the time delay between the times of closure of contacts 8, 9 and of the effective operation, as well as the rate of operation of element 23.

The mode of operation of the control system of Fig. 1 is described below with the aid of Fig. 2(a) and Fig. 2(b). However, in order that the description of the operation may be better understood, and also to facilitate the actual construction of a control system in accordance with the invention, the following values of circuit elements are suggested. It will be understood that the following values are given only by way of example and do not comprise a limitation of the invention. Assuming that the electric power supply is of 20 volts, 60 cycles A. C.:

| | |
|---|---|
| Rectifier 5 | Selenium Rectifier Elements 25 v. rating. |
| Meter 6 | 0–1 milliammeter. |
| Condenser 7 | 50 microfarads. |
| Electromagnet 1 | 3500 ohms, 35 milliwatts D. C. |
| Heater 25 | 55 ohms. |
| Solenoid 11 | 20 volts A. C. |
| $R_1$ | 20,000 ohms. |
| $R_2$ | 25 ohms. |
| $R_3$ | 100 ohms max. |
| $R_4$ | 25 ohms (nominal). |

*Operation, Fig. 1, Fig. 2*

Assuming in connection with the present example that the control system of Fig. 1 is intended to maintain the concentration of a detergent solution substantially constant, the system is operated as follows: The sensing device or conductivity cell 2 being immersed in the solution, the concentration control $R_3$ is adjusted to a value at which the relay will just fail to be actuated. When the solution concentration decreases, the impedance of cell 2 increases and the output voltage of rectifier 5 increases. This increases the current in electromagnet 1 of the relay, and armature 15 and actuator arm 16 are actuated. Pressure means 18, 19, and 22 then move downwardly closing contacts 8, 9.

Closure of contacts 8, 9 connect solenoid valve 10 to the power source thus actuating the valve member 12 and initiating the flow of additional detergent to the wash tank. Simultaneously the closing of contacts 8, 9 connects heater 25 to the power source so that after a predetermined time period the thermostatic element 23 will bend upwards until pin 24 presses against contact-carrying strip 21. Since the relay is still actuated, pin 18 on actuator arm 16 remains in actuated position, but as element 23 exerts increasingly greater force on strip 21 through pin 24, resilient strip 21 will be deflected upwardly, as shown in Fig. 2(b). As a result of this deflection strip 21 will tend to be bent, or bowed, around pin 24 and will press against protrusion 22 on blade 19 as a fulcrum so that the free end of strip 21 will tend to move downwardly increasing the pressure between contacts 8 and 9. As the pressure of pin 24 further increases against strip 21, blade 19 presses with more and more force against pin 18 tending to move armature 15 away from core 26 on which electromagnet coil 1 is wound, but at the same time increasing the pressure between contacts 8 and 9. When the armature with its air gap adjusting screw 27 (Fig. 2(a)) is urged but a very short distance away from core 26 by continued action of the thermostatic element 23, the attraction of the core on the armature decreases approximately in accordance with the well-known inverse square law with respect to distance over its range of movement, although the aggregate of the forces exerted by springs 19 and 29 (if employed) and by the thermostatic element 23 on the armature is substantially a linear function with respect to distance over the range of movement here contemplated. Consequently the attraction of the core 26 on armature 15 will be overcome and the relay will assume a de-actuated (reset) position even though the signal or actuating current value may not have diminished, or may have diminished but little.

When the relay armature arrives at the de-actuated position, armature 15 will strike adjustable back stop screw 28, but just before this occurs moving contact 8 will suddenly break its connection with fixed contact 9, by "snap" action due to the spring energy stored in the previously bowed contact spring 21. From this it will be seen that the armature 15 moves away from the core 26 before the contacts break, so that the magnetic force on the armature decreases appreciably before the thermostatic heater is de-energized.

The breaking of contacts 8, 9 will, of course, disconnect solenoid coil 11 and heater 25 from the power source, which, respectively, will stop the feeding of detergent and will permit the thermostatic element 23 to cool off and return to its normal position as illustrated in Fig. 1. If at this phase of the operation the value of signal current has dropped to a point representing sufficient solution concentration, the entire system will remain unactuated; but if the signal current represents insufficient solution strength, then the above described cycle will automatically be repeated. From this it will be clear that the system of the present invention provides a relay which slowly oscillates or automatically recycles so as to provide the control or correcting function in discrete time-separated periods, as a result of which the desired condition can be maintained within close limits and without any tendency toward over-control or "over-shooting."

The operation of the armature of the relay in response to the forces acting on it may be described as follows: Assuming that the relay is initially inactive, if a constant actuating current is passed through the electromagnet, armature 15 will be attracted to the pole-piece 26 when the magnetic force is sufficient to overcome the reset force of spring 29 added to that of blade 19 and that of contact strip 21, provided they are all employed. Upon the resulting closure of contacts 8, 9 the thermostatic element 23 will be heated increasingly with time. Consequently, the thermostatic strip will bend increasingly with time and will thereby exert an increasing force in the reset direction against the armature. At any instant the force of the thermostatic element against contact strip 21, and thus against armature extension arm 16, will be essentially that of a cantilever spring or beam deflected within its elastic limit by a force concentrated at its free end. Since the stroke of the armature is extremely short (of the order of 1/32 of an inch) and the transit time of the armature over this stroke is also short (of the order of 10 to 15 milliseconds), the change in flexure of the thermostatic element due to temperature change is insignificant during the stroke. Therefore, the force exerted by the thermostatic element over the distance moved will follow a substantially linear law. On the other hand, as above stated, the opposing forces exerted by the electromagnet on the armature will follow a substantially square law with respect to the armature stroke.

In view of the foregoing it will be seen that as soon as the force exerted by the thermostatic element exceeds the magnetic force on the armature the balance of forces will be upset and the armature will start to move. However, since the magnetic force decreases according to a square law and the reset force decreases according to a linear law, the armature will complete its stroke by a positive movement with increased acceleration, in spite of the fact that the magnetizing current may not have decreased at all.

The positive operation just described is actually enhanced by the thermal capacity of the heater which continues to heat the thermostatic element and thus to impart more resilient force for a moment or two after the heating circuit is broken. Hence, in practice, the resilient force of the thermostatic element not only remains constant, but may actually increase over the period of time during which the opening stroke occurs. If the relay is provided, as herein preferred, with the contact spring action by which the contacts remain closed for an instant after the armature has started to open, the increasing reset force of the thermostatic element on the armature will be effective for even a longer period.

After the armature has returned to the open or de-actuated position and contacts 8, 9 have opened, the thermostatic element will, of course, slowly cool until its force (plus the other reset forces) exerted on the armature is exactly equal to the net effective magnetic force on the armature. At this instant, movement of the armature toward the actuated position becomes incipient, and as soon as the spring force of the thermostatic element further decreases the armature will commence its actuating stroke. Now, this slight incremental movement of the armature toward actuated position will cause the magnetic force to increase according to the square law, while the reset force of the thermostatic element will not exceed the linear law, and in fact is still decreasing. Therefore, the magnetic force will increasingly exceed the reset force and the armature will accelerate toward the closed or actuated position. Here, as above explained, the contacts will close and the cycle will be repeated. Thus the relay in accordance with this invention can oscillate with constant magnetizing current because of the automatic variation in reset force due to the thermostatic element, the rate of change of this force with respect to the armature stroke being always less than the rate of change of the magnetic force on the armature with respect to armature stroke.

In the interest of accuracy it should be mentioned that springs 19 and 21 also constitute cantilever springs except when the "free" end of either presses against another member causing a change in the force-displacement relation of that spring. However, this does not modify the fundamental operation above described.

The air gap screw 27 which, like screw 28 should be of non-magnetic material, in effect controls the magnetic circuit of the relay. It also determines the value of the signal for dropout, viz., the value of actuating current for electromagnet 1 at which the relay de-actuates. The resilient blade 19 is preferably adjusted so that its spring action exerts an upward force on pressure pin 18 of the armature assembly. Return spring 29 produces the same effect on the armature and either spring can be omitted, if desired. Actually, the adjustment of the press-back effect of one or both of the mentioned springs and the adjustment of the screw 27 and of fixed contact screw 9 are interdependent so that the adjustment of one usually requires the readjustment of some or all of the others until a satisfactory balance is achieved. As first above mentioned, the relation of the forces exerted on the armature by the electromagnet and by the thermostatic element may be adjusted over a wide range so that, for example, the control signal may predominate causing lock-in, or the reset force of the thermostatic element may predominate causing automatic oscillation.

If the distance "y" between pin 24 and the pressure point of portion 22 of blade 19 is greater than the distance "x" between the latter point and contact 8, the thermostatic element 23 will have a mechanical advantage with respect to the action of the armature on the contact strip. Such mechanical advantage aids the action of thermostatic element 23 in causing reset of the armature.

In one embodiment of the above described invention as actually employed the adjustments were such that the heater reset the relay and the contacts 8, 9 snapped open in from 8 to 10 seconds after the relay had been actuated. The heater then began to cool, and the thermostatic element 23 relaxed sufficiently to permit the relay to close again in from 40 to 50 seconds with a normal actuating signal impressed on the electromagnet 1. Thus a complete cycle of actuation and de-actuation required approximately one minute. The system was adjusted so that the relay locked in at a control signal value of approximately 12 volts; and at this signal value the thermostatic element 23 was unable to reset the relay. This was desired in the mentioned system for controlling solution concentration because when the solution is very weak it is preferable that the detergent be supplied without interruption until the concentration reaches a value approaching the desired value. When this approaching value was reached the actuating current decreased below 12 volts and the thermostatic element overcame the magnetic attraction and opened the contacts, thus resuming the "on" and "off" cycling which is desirable as the normal condition is more closely approached. The relay continued to recycle at that rate indefinitely as long as the conditions remained constant. As the signal voltage increases, it follows that increased heating time is required to reset the relay because of the additional magnetic pull on the armature. Although under these conditions the cooling time is also increased slightly, the ratio of "on" time to "off" time increases. This is obviously an advantage in most automatic controls because the correction phase is increased approximately in proportion to the departure of the controlled condition from normal.

The circuit arrangement illustrated in Fig. 1 utilizes only the bottom or "in" fixed contact 9 of the relay. Some control systems would, however, require an upper or "out" fixed contact 30 which likewise should be adjustable. Contact 8 which extends on both sides of the strip 21 cooperates with upper contact 30 when the relay is in de-actuated position. If the upper contact is employed, it is preferable that means be provided for pressing the contact-carrying strip 21 positively against contact 30. For this purpose the slight modification illustrated in Fig. 3 is provided. Here it will be seen that attached to actuating arm 16 is an L-shaped extension 31 which includes a hook portion 32 extending beneath contact strip 21. Thus when the armature 15 assumes the de-actuated position because of a decrease of actuating current, hook 32 draws strip 21 upwardly to make a positive connection between contacts 8 and 30.

The modification of the relay structure illustrated in Fig. 4 requires little description because it can be seen to be fundamentally the same in construction and operation as in Fig. 2. It is, however, simplified in the omission of resilient blade 19. As a result the spring action of the contact-carrying strip 21 becomes more important than it is in the embodiment of Fig. 2; and the snap action of the moving contact 8 in breaking connection with fixed contact 9 may not be quite so sudden. However, if the strip 21 is made of sufficiently resilient material and return spring 29 is correctly adjusted the operation of the embodiment of Fig. 4 will be equivalent to that of Fig. 2. It may be noted that in order to obtain equivalent operation, pin 18 is positioned along spring 21 between pin 24 and contact 8. Thus pin 18 of Fig. 4 is equivalent to the bent portion or protrusion 22 of Fig. 2. The fundamental operation and adjustment of this embodiment are in general the same as in Fig. 2. In applications when the above described snap-action is not required, the strip 21 can be rigid, or the moving contact can be attached to the armature as in conventional relays, provided that a suitable reset spring such as spring 29 be employed. In either case, it is assumed that the thermostatic element 23 or its equivalent would be included, if the object of this invention is to be achieved. If the arrangement of Fig. 4 is to include an upper fixed contact 30, the construction and adjustments will be as described in connection with Figs. 2 and 3.

The embodiment of Fig. 5 is fundamentally the same as that of Fig. 1. The principal difference is that it is specifically intended for operation on direct current, whereas the system of Fig. 1 (and of Fig. 6) is intended for alternating current operation although the system of Fig. 1 (as well as the system of Fig. 6) can operate on direct current if the sensing device 2 and the valve 10 or other device to be controlled are both adapted for D. C. operation. In Fig. 5 the sensing device 33 is assumed to be operative on direct current and is shown generally as an impedance of which the value changes with change of the condition to be detected. In this embodiment the rectifier 5 and filter condenser 7 of Fig. 1 are omitted; and the relay is of the construction illustrated and described in connection with Fig. 4.

The embodiment of the invention illustrated in Fig. 6 is essentially the same as that of Fig. 1, but here two relays are employed, both being represented as of the type illustrated and described in connetcion with Fig. 5. However, the type of Figs. 1 and 2 could as well be substituted for one or both of the relays illustrated in Fig. 6.

The first relay, viz., that to the left in the drawing, is connected the same as the relay in Fig. 1 and operates in a similar manner to control the solenoid valve 10, or other suitable device. This embodiment includes in addition, a second relay, to the right in the diagram, having an electromagnet 1a connected in parallel to electromagnet 1 of the first relay so as to receive the same signal. It is convenient to connect in series with electromagnet 1a an adjustable resistor R5 in order to predetermine the relative signal strength in the two relays. A maximum value for resistor R5 of, say, one-half the resistance of the electromagnet coil 1a would usually suffice. The second relay in this embodiment is more especially for signalling purposes and for that reason the device to be controlled is represented as comprising a buzzer 34 which is actuated whenever contacts 8a and 9a close. Obviously any other desired type of signalling device may be employed. In the alternative, another solenoid control valve can be substituted for the buzzer 34, or it can be connected in parallel with the buzzer. In this event the second relay may be adjusted so that if the signal current exceeds a predetermined value this relay will be actuated to provide an additional or emergency supply of detergent, or to effect any other additional corrective factor.

In the arrangement of Fig. 6 a switch 35 is provided to permit selection of the immediate source of actuating current for the device 34. When the switch is thrown as shown in Fig. 6, closure of contacts 8a, 9a connects buzzer 34 to the power source only if contacts 8 and 9 of the first relay are closed. This connection is usually preferred in order to prevent spurious operation of the device 34 due to current surges such as those resulting from the sudden opening of contacts 8, 9 of the first relay. However, for some applications it is desirable to operate the second relay independently of the first, in which event the switch 35 would be thrown down to assume the dotted position.

Because of the inclusion of the various adjustments described in connection with Fig. 2 and Fig. 3 the operation of the two-relay system of Fig. 6 is very flexible, especially as to the relative timing of the relays, viz., the current limits at which they operate, both for actuation and for de-actuation. From this it will be readily understood that the relays and the relay control systems of the present invention are applicable, merely by suitable adjustment, to a wide range of specifically different control systems.

I claim:

1. A relay adapted to operate in a control system, which comprises an electromagnet, an armature actuated thereby, a resilient contact-carrying strip fixed at one end and movable at the other end, a fixed electrical contact cooperating with an electrical contact on said strip, first pressure means movable by said armature disposed to engage said strip at a first point on a first side thereof and adapted to move said strip in a direction to close said contacts by actuation of said armature, means compensating for inherent relay operating differential by opposing the actuating force of said armature comprising a thermostatic element operable when heated to urge said armature toward its de-actuated position, a heater for said element and means including said contacts for connecting said heater to an electric power source, and second pressure means movable by said element when heated and disposed to engage said contact strip on the side opposite said first side thereof and at a second point displaced with respect to said first point longitudinally of said strip.

2. A relay according to claim 1 in which said first point is located intermediate said contacts and said second point longitudinally of said strip.

3. A relay according to claim 2 which includes means for energizing said heater only when said contacts are closed, said second pressure means being disposed to bend said resilient strip against a portion of said first pressure means as a fulcrum while said armature is actuated, and thereby to increase the pressure between said electrical contacts until increasing pressure exerted by said second pressure means on said contact strip overcomes the actuating force of said armature and said contacts open with a snap action.

4. A relay according to claim 1 in which said heater is included in a series circuit comprising said heater, said strip, said fixed contact and said means for connecting an electric power source, whereby said heater is adapted to be energized upon closure of said electrical contacts.

5. A relay according to claim 1, which includes two adjustable stop means cooperating with said armature for predetermining the excursion of said armature in each direction, respectively, thereby comprising means for predetermining the magnitude of energizing current at which the armature is actuated, and at which the armature is reset by operation of said thermostatic element.

6. A relay according to claim 1 in which said first pressure means includes a resilient blade disposed parallel to said resilient strip and also fixed at one end and movable at the other, said blade being interposed between said armature and said strip and having a pressure portion positioned to engage said strip at a point intermediate said contacts and said second point longitudinally of said strip.

7. A relay according to claim 1 in which said armature includes an extension comprising an actuator arm having a free end, a hook portion attached to said free end, said hook portion extending beneath said contact strip so as to engage the same and draw it in said second direction when said armature moves in a de-actuating direction, a fixed electrical back contact against which an electrical contact on said strip rests when said armature is in de-actuated position, and means for adjusting the pressure between the last-mentioned contacts.

8. A self-oscillating relay system which includes a relay comprising an electromagnet, means for energizing said electromagnet with control current, an armature actuated by said electromagnet, a resilient contact-carrying strip fixed at one end and movable at the other end, a relatively fixed electrical contact cooperating with an electrical contact on a movable portion of said strip, first pressure means movable by said armature disposed to engage said strip at a first point and adapted to move said strip in one direction by actuation of said armature, means for compensating inherent relay operating differential comprising a thermostatic element adapted when heated to move in the opposite direction, second pressure means movable by said element disposed to engage said strip at a second point displaced from said electrical contacts more than said first point longitudinally of said strip in the direction of the fixed end thereof, said second pressure means being disposed to urge said strip in said opposite direction thereby tending to press said strip against a portion of said first pressure means as a fulcrum while said armature is actuated so as to increase the pressure between said electrical contacts, an electric heater for said element, an energizing circuit for said heater element comprising in series connection said heater, said strip, said fixed contact and means for connection to a power source whereby said heater is adapted to be energized upon closure of said electrical contacts, a device to be controlled and connections from said device to contacts on said relay and to said means for connection to a power source.

9. In a control system the combination of a relay having an armature and an electromagnet cooperating therewith, a sensing circuit including a sensing device from which a control signal is derived and means for impressing said signal on said electromagnet to energize the same, means for connecting an electric power source to said system and connections from said means to said sensing circuit, a resilient contact-carrying strip fixed at one end and movable at the other end, a relatively fixed electrical contact cooperating with an electrical contact on a movable portion of said strip, first pressure means movable by said armature disposed to engage said strip at a first point and adapted to move said strip in one direction by actuation of said armature, reset mechanism for said relay including a thermostatic element adapted to urge said strip in the opposite direction, second pressure means movable by said element and disposed to engage said strip at a second point displaced from said electrical contacts more than said first point longitudinally of said strip and in the direction of the fixed end thereof, said second pressure means being disposed to urge said strip in said opposite direction thereby tending to press said strip against a portion of said first pressure means as a fulcrum while said armature is actuated so as to increase the pressure between said electrical contacts, an electrical heater for said element, an energizing circuit for said heater comprising in series connection said means for connecting an electric power source, said heater, said strip and said fixed electrical contact, thereby energizing said heater upon closure of said electrical contacts and causing said element to exert reset pressure on said strip and armature so as to compensate inherent relay differential, and means for predetermining the force exerted by said element which is required to exceed a given magnetic force of said electromagnet on said armature.

10. In a control system, the combination of a sensing circuit including a sensing device from which a control signal is derived, means for connecting an electric power source to said system and connections from said means to said sensing circuit, a pair of self-compensating relays each having an armature and an electromagnet cooperating therewith, means for impressing said signal on said electromagnets to energize the same, each relay including a resilient contact-carrying strip fixed at one end and movable at the other end, a fixed electrical contact cooperating with an electrical contact on said strip, first pressure means movable by said armature disposed to engage said strip at a first point and adapted to move said strip in one direction by actuation of said armature, reset mechanism for each relay including a thermostatic element adapted to urge said strip in the opposite direction, second pressure means movable by said element and disposed to engage said strip at a second point displaced from said electrical contacts more than said first point longitudinally of said strip in the direction of the fixed end thereof, said second pressure means being disposed to urge said strip in said opposite direction thereby tending to press said strip against a portion of said first pressure means as a fulcrum while said armature is actuated so as to increase the pressure between said electrical contacts, an electrical heater for the element of a first of said relays, an energizing circuit for said heater comprising in series connection said means for connecting an electric power source, said heater, said strip and said fixed electrical contact of said first relay, thereby energizing said heater upon closure of said electrical contacts of the first relay and causing said element to exert reset pressure on the strip and armature of the first relay so as to compensate inherent relay differential thereof, a device to be controlled and a connection from the strip of said first relay to said device, a second heater for the element of said second relay, a connection from one side of said power connecting means to one terminal of the second heater, a connection from the other terminal of the second heater to the strip of the second relay, means connecting the fixed contact of said second relay to the strip of said first relay, said fixed contact of said first relay being connected to the other side of said power connecting means, whereby the thermostatic element of said second relay is adapted to exert reset pressure on the strip and armature thereof so as to compensate inherent differential of said second relay, and a signalling device connected between the strip of said second relay and the first-identified side of said power connecting means, whereby said signalling device is actuated only when said electrical contacts of the first relay are closed.

11. In a system according to claim 10, a switch comprising an arm connected to the fixed contact of said second relay, and two contacts, one contact being connected to the strip of said first relay by connection to which said signalling device is actuated only when said electrical contacts of the first relay are closed, and the other contact being connected to said other side of said power connecting means by connection to which said signalling device is actuated independently of actuation of said first relay.

12. A relay which comprises an electromagnet, an armature actuated thereby, a resilient contact strip movable at one end and relatively fixed at the other end, an electrical contact disposed on a movable portion of said strip, an electrical contact cooperating with the movable contact, pressure means movable by said armature disposed to engage one side of said strip at a point displaced from the fixed end thereof and adapted to move said strip in a direction to close said contacts by actuation of said armature, means compensating for inherent relay operating differential by opposing the actuating force of said armature comprising a thermostatic element operable when heated to engage the opposite side of said strip so as to urge said pressure means and thereby said armature toward its de-actuated position, a heater for said element, and means including said contacts for connecting said heater to an electrical power source.

13. A relay according to claim 12 which includes means for adjusting the magnitude of the force exerted by said thermostatic element which is required to exceed a given magnetic force of said electromagnet on said armature.

14. A relay according to claim 12 which includes means for adjusting the magnitude of the magnetic force of said electromagnet on said armature which is required to overcome the force exerted by said thermostatic element on said contact strip and thus to maintain the armature in actuated position and to hold said contacts closed.

15. A relay which comprises an electromagnet, an armature actuated thereby, said electromagnet and said armature being separated by a magnetic air gap whereby the force exerted by said electromagnet on said armature follows a substantially inverse square law with respect to distance over its range of movement, a resilient contact strip movable at one portion and relatively fixed at another portion, an electrical contact disposed on the movable portion of said strip, an electrical contact cooperating therewith, pressure means movable by said armature in response to actuation of said armature and disposed to engage said strip so as to move the same in a direction to close said contacts, means compensating for inherent relay operating differential by opposing the actuating force of said armature exerted on said contact strip, said compensating means being disposed and adapted to exert a relay-differential compensating force on said armature which follows a substantially direct linear law with respect to distance over its range of movement, and means responsive to the closing of said contacts for initiating the actuation of said compensating means and responsive to the opening of said contacts for initiating the de-actuation of said compensating means.

16. A relay according to claim 15 which includes means for adjusting the relation of said forces comprising means for adjusting the length of said air gap.

17. A relay according to claim 15 which includes means for predetermining the pull-in and drop-out points of the relay comprising a back stop and a return spring for said armature, and means for adjusting the length of said air gap between said electromagnet and said armature.

18. A relay which comprises an electromagnet, an armature actuated thereby, said electromagnet and armature being separated by a magnetic air gap whereby the force exerted by said electromagnet on said armature follows a substantially inverse square law with respect to distance over its stroke, a resilient contact strip movable at one portion and relatively fixed at another portion, a first electrical contact disposed on the movable portion of said strip, a second electrical contact cooperating with said first contact, pressure means movable by said armature in response to actuation of said armature and disposed to engage said strip so as to move the same in a direction to close said contacts, means compensating for inherent relay operating differential by opposing the actuation force of said armature exerted on said contact strip, said compensating means comprising a thermostatic element, connections for an electric power source, means for heating said element such that the compensating force exerted on said armature by said thermostatic element follows a substantially linear law with respect to distance over its range of movement during said stroke, and circuit means between said contacts, said heating means and said power source connections whereby the closing of said contacts energizes said heating means, and the opening of said contacts de-energizes said heating means.

19. A combination according to claim 18 which includes means for adjusting the time rate of operation of said thermostatic element and thus for adjusting the timing of opening and closing of said contacts, comprising current-adjusting means connected in circuit with said heater.

20. An electromechanical relay which comprises an electromagnet, an armature actuated thereby, a flexible contact strip fixed at one end, free at the other end and carying a first contact near the free end thereof, a second contact cooperating with the first contact and supported independently of said strip, first pressure means movable by said armature and including a portion disposed to press against said strip at a first point thereon so as to move said strip in a direction to close said contacts upon actuation of said armature, means for compensating inherent relay differential comprising a thermostatic element adapted when heated to urge said armature in the opposite direction tending to open said contacts, and second presure means movable by said element when flexed by heating to press against said strip at a second point thereon displaced from said first electrical contact more than said first point longitudinally of said strip in the direction of the fixed end thereof, said second pressure means being disposed to urge said strip in said opposite direction so as to bend said strip around said second pressure means and press it against said portion of said first pressure means as a fulcrum while said armature is actuated, thereby to increase the pressure between said contacts until the increasing force exerted by said thermostatic element on said armature overcomes the magnetic force exerted by said electromagnet on said armature, whereby said contacts open by snap action.

21. A relay according to claim 20 in which said first pressure means includes a resilient blade fixed at one end, free at the other end and disposed substantially parallel to said contact strip between said strip and a portion of said armature, pressure means carried by said portion of the armature and which presses against said blade, and a protrusion carried by said blade which presses against said strip in a contact-closing direction when the relay is actuated, said protrusion being disposed so as to press against said strip at a point located longitudinally thereon between said first contact and said second point on said strip.

22. A relay which comprises an electromagnet, an armature actuated thereby, a movable resilient contact strip, an electrical contact disposed on a movable portion of said strip, a relatively fixed electrical contact cooperating with said movable contact, pressure means movable by said armature in response to actuation thereof and disposed to engage one side of said strip so as to move the strip in a direction to close said contacts, means compensating for inherent relay operating differential by opposing the actuating force of said armature exerted on said contact strip, said compensating means including second pressure means disposed to engage the opposite side of said strip and exerting thereon a relay-differential compensating force which increases with time, and means responsive to the closing of said contacts for initiating the actuation of said compensating means and responsive to the opening of said contacts for initiating the de-actuation of said compensating means.

23. A relay which comprises an electromagnet, an armature actuated thereby, a first contact, a second contact movable by said armature so as to connect with said first contact in response to actuation of said armature, resilient reset means continuously acting on said armature in opposition to the action of the electromagnet thereon, and means for compensating inherent operating differential of said relay comprising pressure means for supplementing and increasing the reset action of said resilient means on said armature, said pressure means comprising a thermostatic element, a heater therefor, and circuit means adapted to energize said heater in response to closure of said contacts.

24. A relay which comprises an electromagnet, an armature normally in open position and movable by said electromagnet into closed position, an electric contact movable by said armature, an electric contact relatively fixed, and normally open, with respect to the movable contact and positioned to connect therewith in closed position of said armature, normally deactuated reset means which when actuated presses against said armature urging it toward open position, and means including connections between said contacts and said reset means by which said reset means is adapted to be actuated and deactuated respectively in response to closing and opening of said contacts, said electromagnet and armature having a magnetic-force-versus-movement characteristic which decreases more rapidly than the force-versus-movement characteristic of said reset means and armature during the de-actuation stroke of the armature, and which increases more rapidly than that of said reset means during the actuation stroke of the armature.

25. A relay which comprises an electromagnet, an armature actuated in one direction thereby, a pair of normally open electric contacts one movable by said armature and one relatively fixed with respect to the movable contact, first reset means continuously acting on said armature in opposition to the action of the electromagnet thereon and thereby tending to move the armature in reset direction, and means for compensating inherent operating differential of said relay comprising second reset means actuated and de-actuated in response respectively to the closing and opening of said contacts for supplementing and increasing the reset action on said armature of said first means, said second reset means being characterized in that the reset force which it exerts on the armature changes at a rate less than the rate of change of the magnetic force on the armature in respect to armature stroke in each direction.

26. A relay which comprises an electromagnet, an armature actuated thereby, a pair of normally open electric contacts one movable by said armature and one relatively fixed with respect to the movable contact, resilient reset means continuously acting on said armature in opposition to the action of the electromagnet thereon, and means for compensating inherent operating differential of said relay comprising pressure means actuated and de-actuated in response to the closing and opening of said contacts for supplementing and increasing the reset action of said resilient means on said armature independently of the action of said electromagnet, said pressure means being of the type which increases applied force with time.

27. A relay which comprises an electromagnet, an armature actuated thereby, a movable contact strip, an electrical contact disposed on a movable portion of said strip, a relatively fixed electrical contact cooperating with said movable contact, pressure means movable by said armature in response to actuation thereof and disposed to engage said strip so as to move the strip in a direction to close said contacts, means compensating for inherent relay operating differential by opposing the actuating force of said armature as exerted on said contact strip, said compensating means including second pressure means disposed to engage said strip so as to exert thereon a relay-differential compensating force which increases with time, and means responsive to the closing of said contacts for initiating the actuation of said compensating means and responsive to the opening of said contacts for initiating the de-actuation of said compensating means.

References Cited in the file of this patent
UNITED STATES PATENTS

| | | |
|---|---|---|
| 1,230,172 | Kiefer | June 19, 1917 |
| 1,653,685 | Whittington | Dec. 27, 1927 |
| 1,785,852 | Wilms et al. | Dec. 23, 1930 |
| 2,020,474 | Parsons et al. | Nov. 12, 1935 |
| 2,033,013 | Thompson | Mar. 3, 1936 |
| 2,177,832 | Knos | Oct. 31, 1939 |
| 2,338,731 | Morse | Jan. 11, 1944 |
| 2,410,198 | Buckley | Oct. 29, 1946 |
| 2,443,968 | Swing | June 22, 1948 |